US009920553B2

(12) United States Patent
Limbert et al.

(10) Patent No.: US 9,920,553 B2
(45) Date of Patent: Mar. 20, 2018

(54) POINT-OF-CARE HAND HYGIENE DISPENSER HAVING SECURITY FEATURES

(71) Applicant: DEBMED USA LLC, Charlotte, NC (US)

(72) Inventors: Dean Philip Limbert, Derby (GB); Christopher Lang, Nottingham (GB); Robert Butler, Nottingham (GB); David Creaghan, Derby (GB)

(73) Assignee: DEB IP LIMITED, Derbyshire (GB)

( * ) Notice: Subject to any disclaimer, the term of this patent is extended or adjusted under 35 U.S.C. 154(b) by 0 days.

(21) Appl. No.: 14/885,475

(22) Filed: Oct. 16, 2015

(65) Prior Publication Data

US 2016/0040455 A1 Feb. 11, 2016

Related U.S. Application Data

(62) Division of application No. 14/185,568, filed on Feb. 20, 2014.

(51) Int. Cl.
*B67B 1/00* (2006.01)
*E05B 65/00* (2006.01)
(Continued)

(52) U.S. Cl.
CPC .............. *E05B 65/006* (2013.01); *A47K 5/12* (2013.01); *A47K 5/1211* (2013.01);
(Continued)

(58) Field of Classification Search
CPC .... E05B 65/0061; E05B 65/02; E05B 65/006; E05B 65/06; E05B 35/002; A47K 5/12;
(Continued)

(56) References Cited

U.S. PATENT DOCUMENTS 6,269,837 B1 8/2001 Arent et al.
6,619,509 B2 * 9/2003 DeKoning ............... A47K 5/12
222/183

(Continued)

FOREIGN PATENT DOCUMENTS

WO 2013070888 A1 5/2013

OTHER PUBLICATIONS

International Preliminary Report on Patentability corresponding to International Patent Application No. PCT/US2015/011328, dated Sep. 1, 2016, 8 pages.

(Continued)

*Primary Examiner* — Lien Ngo
(74) *Attorney, Agent, or Firm* — McAndrews, Held & Malloy, Ltd.

(57) ABSTRACT

Various embodiments of a point-of-care hygiene dispenser and an electronic hand hygiene event monitoring system are disclosed. One embodiment is directed to point-of-care dispenser and a corresponding electronic monitoring system, wherein the point-of-care dispenser is movable between predetermined zones of interest. Another embodiment is directed to a secure point-of-care dispenser having corresponding dispenser cover and main body interlocks. A still further embodiment is directed to point-of-care dispensing system comprising a point-of-care dispenser having a dispenser cover and a main body, a locking mechanism configured to secure the dispenser covers with the main body in a closed condition, and a docking unit configured for mounting with the point-of-care dispenser.

7 Claims, 11 Drawing Sheets

(51) Int. Cl.
*G08B 21/24* (2006.01)
*A47K 5/12* (2006.01)
*E05B 35/00* (2006.01)
*E05B 65/06* (2006.01)
*H04W 52/38* (2009.01)

(52) U.S. Cl.
CPC .......... *A47K 5/1217* (2013.01); *E05B 35/002* (2013.01); *E05B 65/06* (2013.01); *G08B 21/245* (2013.01); *A47K 2201/00* (2013.01); *H04W 52/383* (2013.01)

(58) Field of Classification Search
CPC ............ A47K 5/1211; A47K 5/1217; A47K 2201/00; G08B 21/245
USPC ...... 222/153.09, 153.03, 153.04, 181.3, 173, 222/180, 181.1, 182, 183, 185.1
See application file for complete search history.

(56) References Cited

U.S. PATENT DOCUMENTS

| | | | |
|---|---|---|---|
| 7,537,030 B2 | 5/2009 | Gallant | |
| 2005/0077385 A1* | 4/2005 | Chen | A47K 5/12 239/302 |
| 2006/0213929 A1* | 9/2006 | Ophardt | A47K 5/12 222/180 |
| 2008/0246599 A1 | 10/2008 | Hufton et al. | |
| 2009/0195385 A1 | 8/2009 | Huang et al. | |
| 2009/0272766 A1 | 11/2009 | Laible | |
| 2010/0134296 A1 | 6/2010 | Hwang | |
| 2011/0011890 A1* | 1/2011 | Rosenkranz | A47K 5/12 222/153.03 |
| 2011/0101029 A1* | 5/2011 | Lewis, II | A47K 5/1202 222/153.03 |
| 2011/0163870 A1 | 7/2011 | Snodgrass | |
| 2012/0248140 A1 | 10/2012 | Iseri et al. | |
| 2013/0092708 A1* | 4/2013 | Geiberger | A47K 5/1209 222/153.03 |
| 2013/0292417 A1* | 11/2013 | Pelkey | B65D 55/10 222/153.03 |

OTHER PUBLICATIONS

International Search Report and Written Opinion of the International Searching Authority for PCT Application No. PCT/US2015/011328 dated Jun. 8, 2015, 11 pages.

* cited by examiner

POINT-OF-CARE HAND HYGIENE DISPENSER HAVING SECURITY FEATURES

CROSS-REFERENCE TO RELATED APPLICATIONS/INCORPORATION BY REFERENCE

This application is a divisional of U.S. patent application Ser. No. 14/185,568, entitled "ELECTRONICALLY MONITORED AND PORTABLE POINT-OF-CARE HAND HYGIENE DISPENSER HAVING SECURITY FEATURES," filed on Feb. 20, 2014. The entire contents of the above-mentioned prior-filed application are hereby expressly incorporated herein by reference.

BACKGROUND

Hand care in the workplace implicates both work related activities and worker health. Hand hygiene is essential for certain activities and services including, particularly, healthcare, food preparation, and food service. Hand hygiene is important for virtually all workplaces to maintain a healthy environment and to limit spread of bacteria, viruses and other disease causing microorganisms. Hand hygiene can be accomplished by washing with soap and water and by using liquids such as a sanitizing product which does not require water or rinsing of the product. Hygiene products that are used for hand hygiene are commonly dispensed by dispensers that are located where hand hygiene is desired. Hand skin care products can promote worker health in avoiding and treating hand skin conditions that can reduce worker performance and productivity.

The spread of healthcare acquired infections, also known as HAIs, has been an ever-increasing challenge in healthcare facilities. HAIs can result from transmission of bacteria, viruses, and other disease causing microorganisms from various sources such as a patient or environmental surfaces to another patient or surface via the hands of healthcare workers. A consequence of such transmission can be infection of a patient who was previously not infected. Health care facilities have battled MRSA (methicillin-resistant *staphylococcus aureus*), VRSA (vancomycinresistant *staphylococcus aureus*), and other drug resistant microorganisms for many years. These problems have been more apparent in recent years. It is estimated that approximately 2,000,000 such HAIs occur annually in the U.S. alone, resulting in about 100,000 deaths. The extra costs associated with these infections are estimated in the billions of dollars.

Healthcare institutions seek to prevent and control the spread of HAIs. One important aspect of such efforts is seeking to ensure that health care professionals comply with hand hygiene best practices. One way to monitor compliance with hand hygiene best practices is to monitor use of hand hygiene product dispensers. Use of such dispensers indicates that hand hygiene has occurred. Dispensers have been adapted to report use such as dispensers disclosed by U.S. patent application Ser. Nos. 12/823,475 and 13/427,467 which are assigned to the applicant of this application and are incorporated herein by reference.

The World Health Organization has identified five moments of hand hygiene in a healthcare setting. Those five moments for hand hygiene actions are: 1) before patient contact; 2) before performing an aseptic task; 3) after body fluid exposure risk; 4) after patient contact, and 5) after contact with patient surroundings. These five moments provide guidelines for hand hygiene within a healthcare setting. Compliance with such guidelines may be evaluated based on monitoring the number of hand hygiene events at locations within a healthcare institution at each of the five moments.

Compliance with guidelines or recommended practices for hand hygiene may be monitored using one of a number of approaches including direct observation, tracking product consumption, and more recently electronic monitoring systems. By using a low cost electronics to monitor hand hygiene dispenser usage events, a compliance rate can be ascertained for a predetermined area of interest over a predetermined time period.

Some low cost monitoring systems rely on the dispensers being in fixed locations, so that the dispenser usage events that are captured are assigned to the correct area of interest. However, such dispenser monitoring systems are not capable of monitoring dispensers fixed to portable equipment since the system cannot determine where the equipment was when the usage event was captured. It may be possible to use RTLS (real-time locating system) technology to track the position of portable equipment/dispensers within a facility. However, this approach does not qualify as 'low-cost' solution as it requires the installation of an extensive RF infrastructure that breaks down the facility into zones in order to correctly triangulate the position of any given dispenser. Triangulation systems are also subject to a substantial amount of position error absent line of sight conditions.

Other issues arise as alcohol based hand sanitizers become more commonplace in healthcare environments. Such issues include theft and, in some cases, consumption of the products. Some existing systems attempt to secure the product bottle against an 'easy' theft. However, they are generally based upon a 'knack-open' approach that does not withstand a prolonged attempt to gain access. Further, existing point-of-care dispensers often employ "easy fix" mounting options, such as a clamping arrangement in which the whole dispenser is easily removable should the perpetrator not be able to remove just the product pack.

Accordingly, the present inventors have recognized a need for a point-of-care dispenser that: 1) can be securely installed in a wide variety of locations; 2) is securely lockable to fully prevent the theft of the hand hygiene product; and/or 3) can be integrated into a low cost hand hygiene compliance monitoring system whereby dispenser usage events are captured and assigned to a relevant predetermined area of interest.

SUMMARY

Various embodiments of a point-of-care hygiene dispenser and an electronic hand hygiene event monitoring system are disclosed. One embodiment is directed to a point-of-care dispenser and a corresponding electronic monitoring system, wherein the point-of-care dispenser is movable between predetermined zones of interest. Actuation of the point-of-care dispenser results in an RF transmission event at a first power level having a transmission range generally limited to a predetermined zone of interest in which the point-of-care dispenser has been actuated. The embodiment also includes a plurality of RF transceivers disposed in each of the predetermined zones of interest. Each RF transceiver is configured to receive the RF transmission events from a point-of-care dispenser in the respective predetermined zone of interest, and to transmit a further RF signal corresponding to the actuation at a second power level having a transmission range extending beyond the pre-determined zone of interest.

Another embodiment is directed to a secure point-of-care dispenser. The point-of-care dispenser comprises a main body having an interior defining a hand hygiene cartridge chamber, and a dispenser cover secured with the main body for pivotal movement of the dispenser cover between an open condition with respect to the main body, and a closed condition with respect to the main body. The point-of-care dispenser also includes at least one main body interlock secured to the main body, wherein the at least one body interlock includes an undercut feature, and at least one dispenser cover interlock secured to the dispenser cover, wherein the at least one dispenser cover includes an undercut feature. The undercut features of the at least one dispenser cover interlock and the at least one main body interlock engage one another when the dispenser cover is in a closed position with respect to the main body. Engagement between the undercut features increases in response to an increase in a prying force used to move the dispenser cover from the closed condition to the open condition.

A still further embodiment is directed to point-of-care dispensing system comprising a point-of-care dispenser having a dispenser cover and a main body, a locking mechanism configured to secure the dispenser covers with the main body in a closed condition, and a docking unit configured for mounting with the point-of-care dispenser. The docking unit and point-of-care dispenser are interconnected with a further locking mechanism that is only accessible for release of the point-of-care dispenser from the docking unit when the dispenser cover and main body are in an open state.

DETAILED DESCRIPTION

Figure 1:
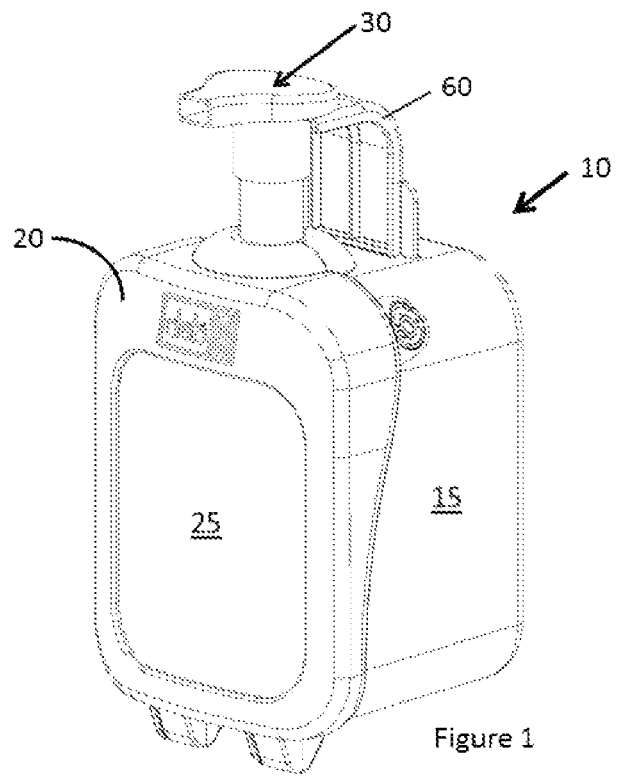
FIGS. 1 through 4 illustrate a point-of-care dispenser that may be used in an electronic monitoring system.
Figure 2:
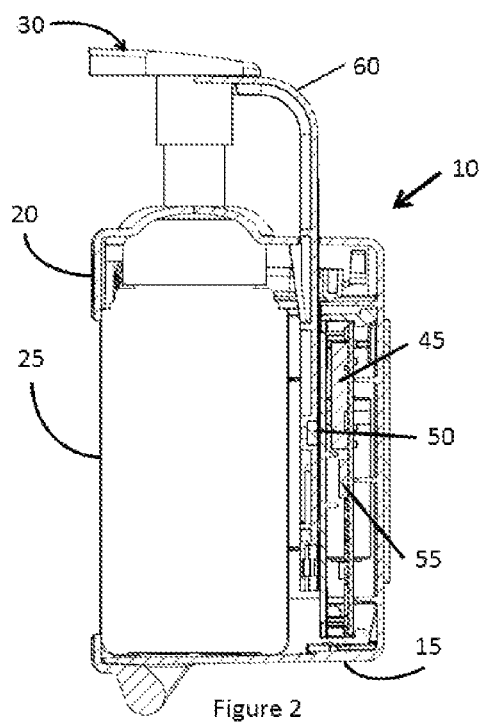
Figure 3:
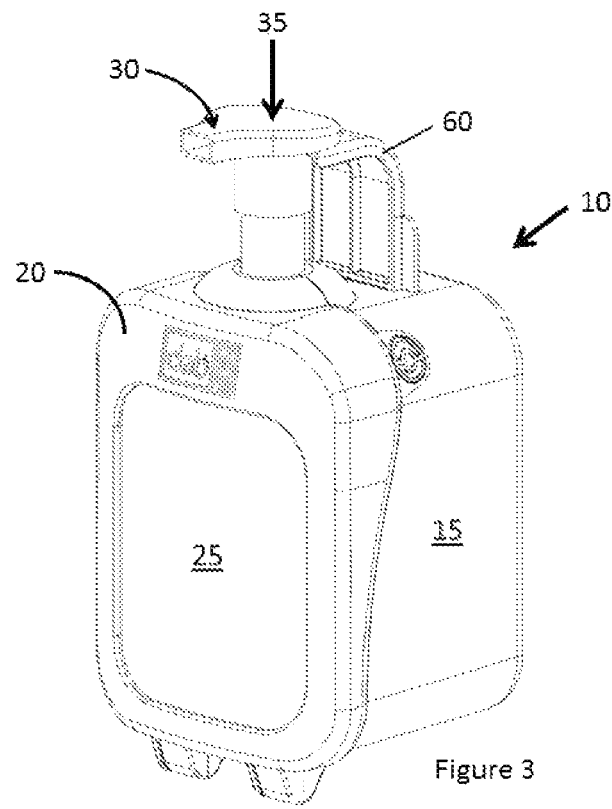
Figure 4:
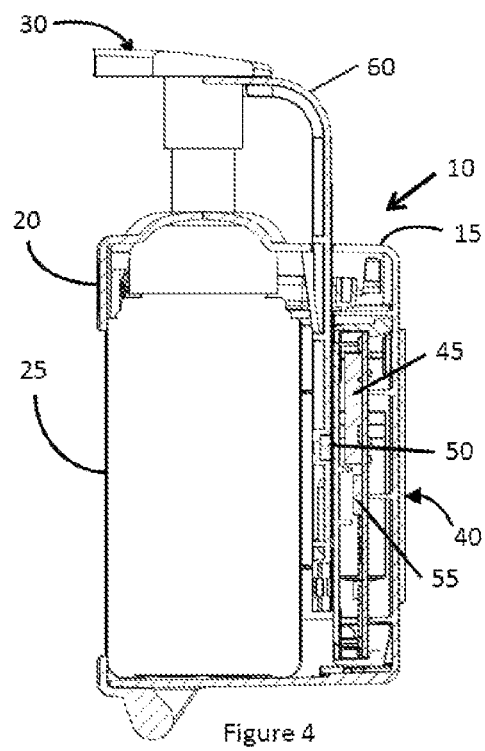

FIGS. 1 through 4 illustrate a point-of-care dispenser 10 having a main body 15 and dispenser cover 20. The main body 15 and dispenser cover 20 are dimensioned to enclose a hand hygiene cartridge 25, or other container for a hand hygiene product. The hand hygiene product is dispensed from the hand hygiene cartridge 25 by actuating a dispensing pump 30 at a top of the care dispenser in the direction shown by arrow 35.

Various low-power transmission elements are disposed at a rear portion of the main body 15 to provide an ultra-low power RF signal indicating that the dispensing pump 30 has been actuated. In this example, the ultra-low power transmission elements, shown generally at 40, are disposed at a rear portion of the main body 15. In this example, the ultra-low power transmission elements 40 include an ultra-low power radio unit 45, a trigger magnet 50, and a reed switch 55.

In operation, as the dispensing pump 30 is depressed, its travel is tracked by a follower 60. The trigger magnet 50 is configured to move with the follower 60 as the dispensing pump 30 is pressed and released. In turn, the motion of the trigger magnet 50 actuates the reed switch 55, which activates the ultra-low power radio unit 45. As the magnetic field of the trigger magnet 50 acts upon the reed switch 55, the ultra-low power radio unit 45 is energized and transmits a dispenser usage event via an ultra-low power RF signal transmission. Multiple pushes that occur within a predetermined time, such as 2.5 seconds, may be collated to represent a single usage event with multiple activations.

The trigger magnet 50 is positioned so that it only reports hand hygiene events in which the pump is activated sufficiently to dispense an appropriate volume of hand hygiene product. As the pump returns to the top of a stroke, so does the follower 60 propelled by a return spring, ensuring that the magnets of the trigger magnet 50 do not generate a magnetic field that acts upon the reed switch 55.

Figure 5:
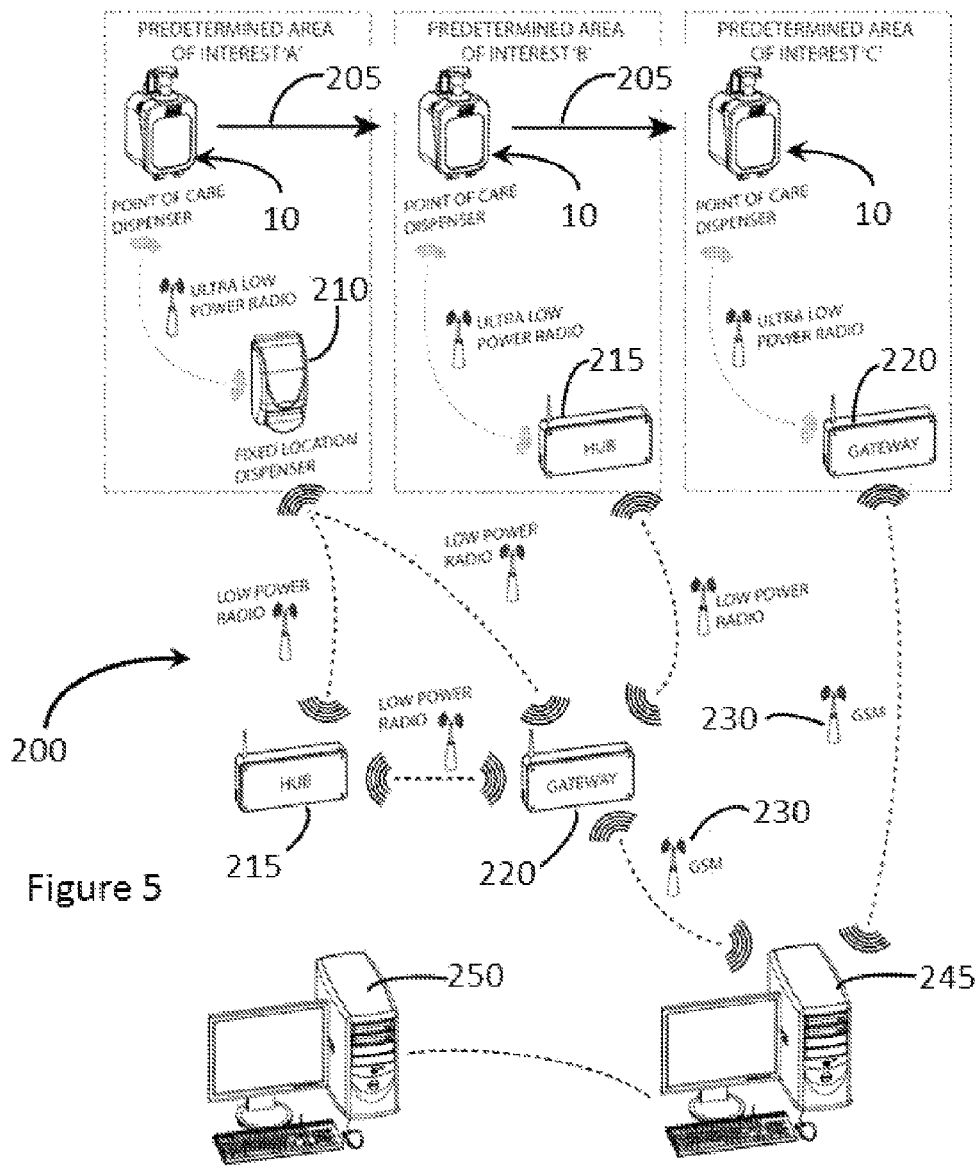
FIG. 5 is a diagram of an electronic monitoring system that may be used to monitor one or more point-of-care dispensers, for example, such as those shown in FIGS. 1 through 4.

The relative location of the point-of-care dispenser 10 may be tracked as it is activated in predetermined areas of interest. FIG. 5 shows an electronic hand hygiene event monitoring system 200 that may accomplish such tracking.

In this example, the point-of-care dispenser 10 is portable between predetermined zones of interest A, B, and C, as shown by arrows 205. Actuation of the point-of-care dispenser 10 results in an RF transmission event at a first power level having a range generally limited to the greatest distance between the point-of-care dispenser 10 and a corresponding higher power transceiver disposed respectively in each the predetermined zones of interest A, B, or C. The range may be selected so that the RF transmission events from a point-of-care dispenser 10 in a first one of the predetermined zones of interest are not received by the transceiver in a second one of the predetermined zones of interest. In some instances, however, the RF transmission events from the first zone of interest incidentally propagate to the second predetermined zone of interest. However, the RF transmission events will have different amplitudes, and a corresponding transceiver may differentiate between RF transmission events occurring in different predetermined zones of interest using signal amplitude by, for example, only accepting/responding to RF transmission events occurring above a predetermined signal amplitude. The transceivers in each of the predetermined zones of interest may be configured to respond to different predetermined signal amplitudes to accommodate different zone sizes. Additionally, the portable point of care dispenser 10 may be configured to transmit an identification with the dispenser usage event that identifies the source of the event to be a portable dispenser. With this addition, dispenser usage events may be identified upon receipt of the event.

In one example, the first power level may be an ultra-low power signal having a transmission range between about 1 meter and 3 meters. The level of the ultra-low power signal may correspond to the power generated by the relative movement of the trigger magnet 50 and reed switch 55 to the ultra-low power radio unit 45. Multiple point-of-care dispensers may be used in the hand hygiene event monitoring system 200, in which case, each point-of-care dispenser may transmit a unique digital code that differentiates each particular point-of-care dispenser from the others.

Various circumstances exist in which the point-of-care dispenser 10 is moved between the predetermined zones of interest. For example, the point-of-care dispenser 10 may be configured for mounting to a patient bed, IV unit, patient monitoring system, etc., where the particular object to which it is mounted can be moved between the predetermined zones of interest.

The hand hygiene event monitoring system 200 monitors dispenser usage in predetermined zone of interest. In a healthcare facility, for example, the zones of interest may correspond to identified patent care locations. The monitoring system 200 includes a plurality of RF transceivers that are each disposed in and associated with a predetermined zone of interest. Dispenser usage events received by an RF transceiver are associated with the zone of interest in which the RF transceiver is located.

Each RF transceiver is configured to receive the RF transmission events from the point-of-care dispenser in the respective predetermined zone of interest, and to transmit a further RF signal at a second power level having a range extending beyond the predetermined zone of interest. In one example, the second power level may have a transmission range between about 30 meters and 60 meters.

One or more of the plurality of RF transceivers may be disposed at a fixed location within the respective predetermined zone of interest, such as on a wall, desk, door, etc. At least one of the plurality of RF transceivers may be: 1) a fixed point-of-care dispenser 210, such as the one shown in predetermined zone of interest A; 2) a fixed hub 215, such as the one shown in predetermined zone of interest B; and/or 3) a gateway 220, such as the one shown in predetermined zone of interest C. In one example, ultra-low power radio unit 45 may be a transceiver, in which case the fixed location point-of-care dispensers, hubs, and gateways that make up the monitoring system network may have the ability to receive and acknowledge the short-range messages that the point-of-care dispensers 10 transmit. It may be advantageous for fixed point of care dispensers to identify events received from portable dispensers to transmit those events rather than an event from a fixed point of care dispenser which transmit at the second power level and should not need to be again transmitted by another fixed point of care dispenser.

The dispenser usage event data transmitted by a point-of-care dispenser and captured by a fixed location device (dispenser/hub/gateway) can be assigned to the predetermined area of interest associated with the fixed location transceiver. This may be achieved by appending the point-of-care dispenser usage event data with the specific identification of the fixed location device before transmitting it on through the rest of the system. In other words, where the point-of-care dispenser 10 has a unique identifier in its transmission, the unique identifier of the fixed location transceiver is appended to the unique identifier of the point-of-care dispenser before transmitting it to the rest of the system.

Hand washing event data is transmitted from the higher power transceivers in each of the predetermined zones of interest to one or more of: 1) a GSM 230, 2) a gateway 220, and/or 3) a hub 215, to one or more computers 245. Computer 245 may communicate the event data to computer 250, where it is compiled into a format suitable for use by the healthcare facility.

Once the point-of-care dispenser usage data enters the monitoring system network, it may be handled by the network in the same way as fixed dispenser usage data and pushed through to a data collection server. The dispenser usage data from both the wall mounted dispensers and the point-of-care dispensers can then be assigned to the relevant predetermined area of interest and used in the hand hygiene compliance calculation for that area.

Figure 6:
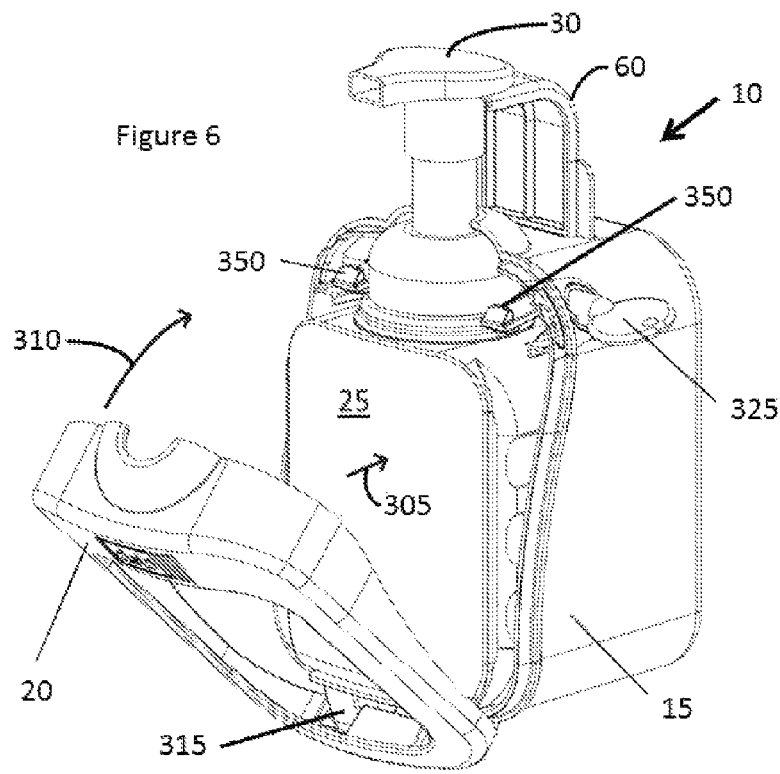
FIGS. 6-12 show examples of various elements of a point-of-care dispenser that includes security features that address issues such as theft of the hand hygiene cartridge.

FIGS. 6-12 are examples of various elements of a point-of-care dispenser 10 that includes security features that address issues such as theft of the hand hygiene cartridge 25. FIG. 6 shows the point-of-care dispenser 10 in the open position with the hand hygiene cartridge 25 loaded in a chamber of the main body 15. In the illustrated example, the hand hygiene cartridge 25 is inserted into the main body 15 in the direction of arrow 305. The dispenser cover 20 may then be rotated in the direction shown by arrow 310 about a hinged joint 315 to a closed position.

In the closed position, multiple elements of the dispenser cover 20 and main body 15 engage one another to lock the upper portions of the dispenser cover 20 and the main body 15 with one another. In the illustrated example, dispenser cover locking elements of the dispenser cover 20 smoothly engage corresponding main body locking elements of the main body 15 as the point-of-care dispenser 10 is closed. However, once the locking elements of the dispenser cover 20 and main body 15 are engaged, unauthorized access is prevented unless a key 325 is used to unlock the point-of-care dispenser 10. Attempts by an unauthorized individual to pry the dispenser cover 20 from the main body 15 causes the locking elements to engage one another more firmly and with greater force thereby thwarting theft of the hand hygiene cartridge 25.

The locking features of the main body 15 include locking arms 350 disposed at an upper portion of the main body 15 on opposite sides of the chamber used to hold the hand hygiene cartridge 25. Each locking arm 350 has a rear portion 355 engaging a crossbar 360, which extends between the rear portions 355 to connect the locking arms 350 with one another. The rear portion 355 of each locking arm 350 terminates at a lock spring 365 that provides a biasing force 370 against a tab 375 extending from an inner surface of the main body 15. In one example, the lock spring 365 is formed from a resilient material and extends along a length of a rear portion of the main body 15. When configured in this manner, the lock spring 365 may have opposed ends terminating at upper portions 380, which engage the tabs 375. Curved portions 385 extend respectively from each of the upper portions 380 and terminate at a mid-portion of a lower transverse member 390 of the lock spring 365. The curved portions 385 deform when the rear portions 355 are urged in an upward direction against the tabs 375. This deformation results in a biasing force 370 in the downward direction to counter the upward movement.

Each locking arm 350 also includes a pivot portion 400 having a generally circular cross-section. A key barrel 405 extends from the pivot portion 400 of each locking arm 350 toward the exterior of the main body 15 where it may accept key 325. A rail 410 is disposed below the pivot portion 400, where it engages a tab 415 on one side, and a pivot spring 420 on the other side. In one example, the pivot spring 420 includes a flexible arm 425 having a first end 430 in fixed engagement with a lower portion of the key barrel 405 and a second, flared end 435 proximate the rail 410. When the pivot portion 400 is rotated about its axis, the flared end 435 engages the rail 410 causing the flexible arm 425 to deform thereby providing a biasing force against the rotation of the locking arm 350. The combined biasing forces of the lock spring 365 and pivot springs 420 direct the locking arms 350 to their normal position, where the lower, rear portions of the locking arms 350 rest upon the respective rails 410.

The forward portion of each locking arm 350 terminates at the principal portion of a main body interlock 440. Each main body interlock 440 of the illustrated example includes an arm 445 extending from the pivot portion 400, an opening 450 extending at least partially through the arm 445 in a vertical direction, and a hook element 460. The rear portion of the hook element 460 includes a flat surface and a lip forming a main body interlock undercut. The front portion of the hook element 460 includes a generally rounded lower face and rearwardly slanted upper face.

Dispenser cover interlocks 465 extend from an interior surface of the dispenser cover 20 to engage respective main body interlocks 440. Each dispenser cover interlock 465 may include a pair of parallel sidewalls extending toward the rear of the dispenser cover 20 and terminating at a rectangular opening 470, which is configured to accept the hook element 460. The sidewalls may be joined by a crossbar 473 at the lower edge of the rectangular opening 470 to form a dispenser cover interlock undercut. The dispenser cover interlock undercut is configured to engage the opening 450 of the locking arm 350. Further, each sidewall may terminate at a respective cam 475, which is configured to engage the front portion of the hook element 460 as the dispenser cover 20 closes with the main body 15.

Figure 7:
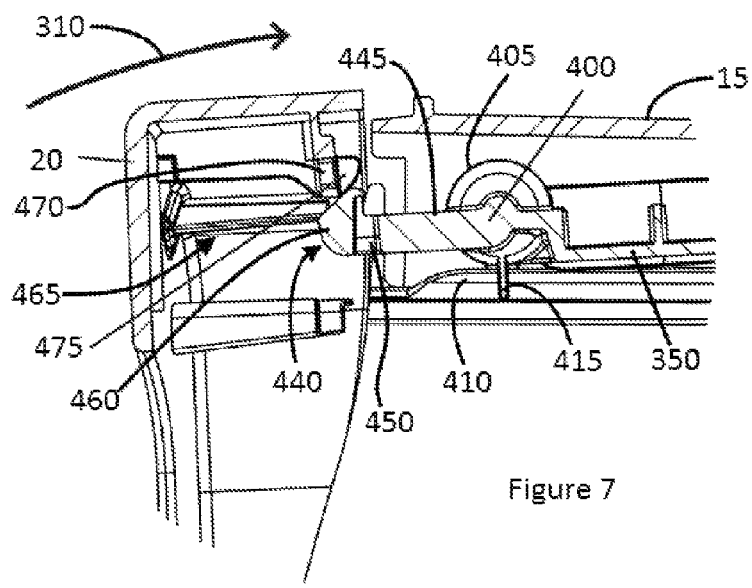

FIG. 7 shows the main body interlock 440 and the dispenser cover interlock 465 as the dispenser cover 20 is rotated in the direction of arrow 310 to close with the main body 15. During this motion, the rearwardly slanted upper face of the hook element 460 engages a corresponding curved surface of a respective cam 475 thereby rotating the lever arm about the pivot portion 400 against the forces of the lock spring 365 and pivot springs 420. The camming action provides for fluid movement of the dispenser cover 20 to the closed position, where it is locked with the main body 15. As such, the lead-in faces of both the main body interlock 440 and dispenser cover interlock 465 ease past one another to the closed position.

Figure 8:
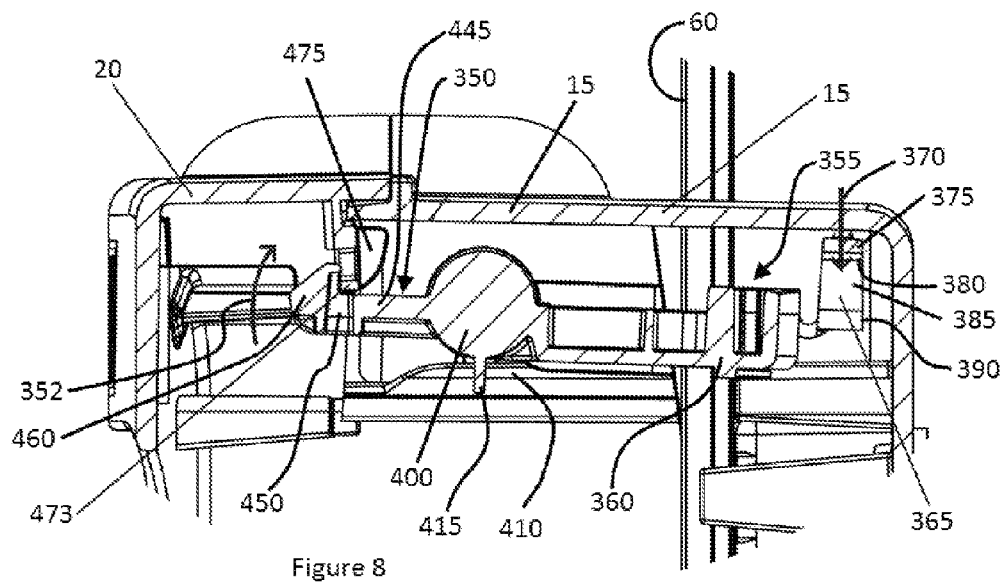
Figure 9:
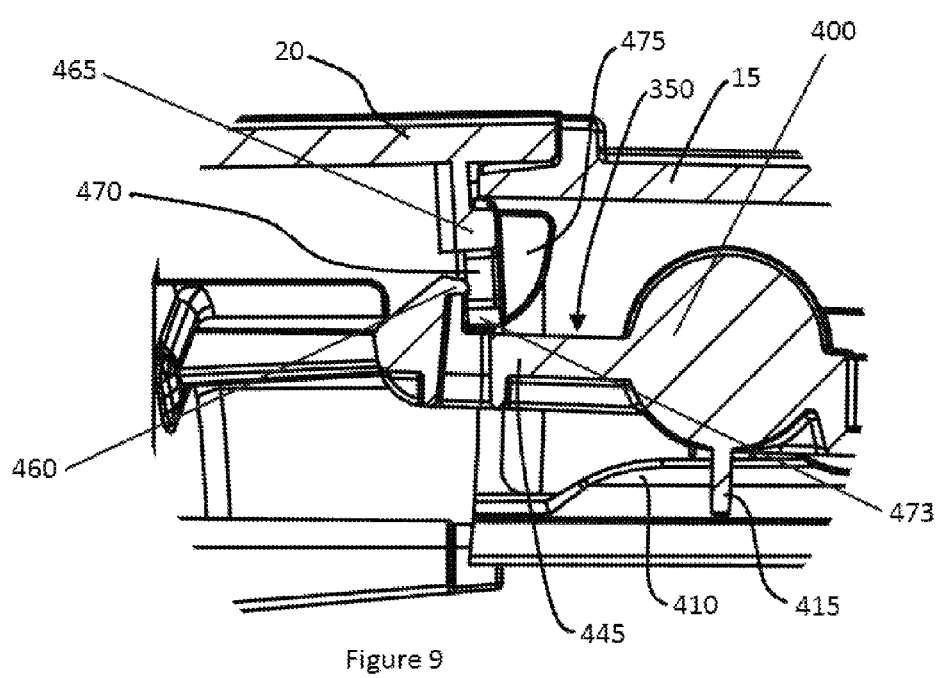
Figure 10:
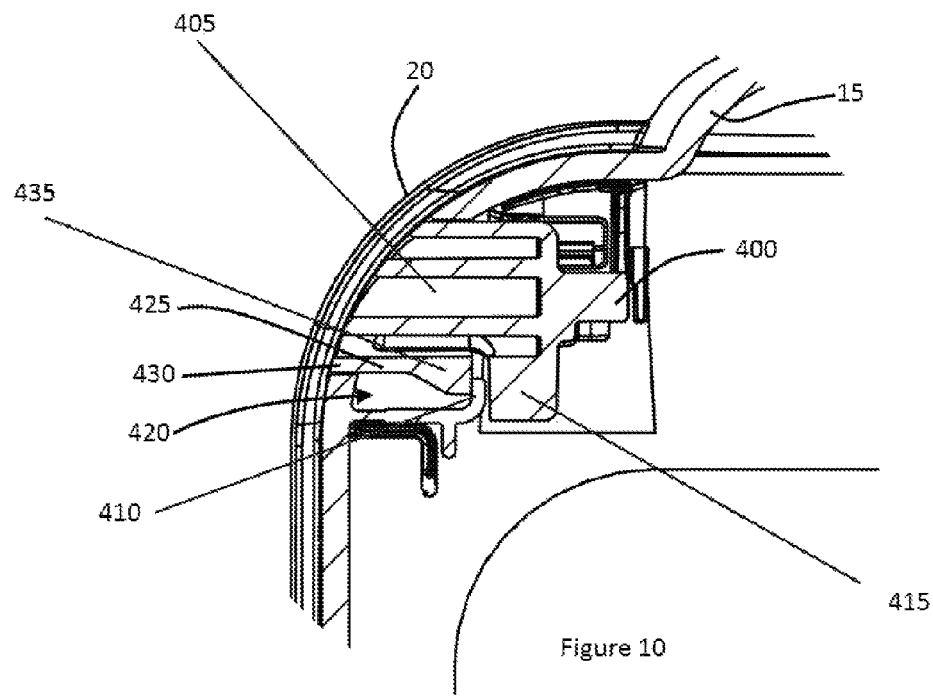

FIGS. 8 and 9 show the main body 15 and dispenser cover 20 in the closed position. Once the dispenser cover 20 has been rotated from the partially closed position to the completely closed position shown in FIGS. 8 and 9, the rearwardly slanted upper surfaces of the hook elements 460 are no longer engaged with the curved surfaces of the respective cams 475. Instead, the locking arms 350 rotate about their pivot portions 400 in response to the forces of the lock spring 365 and pivot springs 420 as indicated by arrow 352 to drive the hook elements 460 into engagement with the dispenser cover interlocks 465, particularly with the dispenser cover interlock undercuts. In this position, the lip of each hook element 460 extends into the rectangular opening 470 of the corresponding dispenser cover interlock 465. Likewise, in the closed position, the crossbars at the lower edges of each rectangular opening 470 engage the openings 450 in the respective arms 445. With the dispenser cover 20 fully closed against the main body 15, the force provided by the lock spring 365 ensures that the principle features of the main body interlock 440 and dispenser cover interlock 465 are fully engaged with one another.

In the event that the dispenser cover 20 of the point-of-care dispenser 10 is subject to leverage force in an unsolicited attempt to open it, the lock integrity will actually increase as the load applied increases. More particularly, the undercut features of the main body interlock 440 and dispenser cover interlock 465 engage one another more tightly as they are pulled apart.

To further improve the security of the lock, additional features have been built into the key barrel 405 that stop externally applied forces from dislodging it from within the point-of-care dispenser 10. More particularly, the key barrel 405 is resiliently deformable such that during assembly it rides up and over the dispenser main body lock retention feature. Once the lock is snapped into position it is retained and restricted from either travelling further inwards or outwards by lock retention features in the event that forces are applied to it in an attempt to gain access into the point-of-care dispenser.

Figure 11:
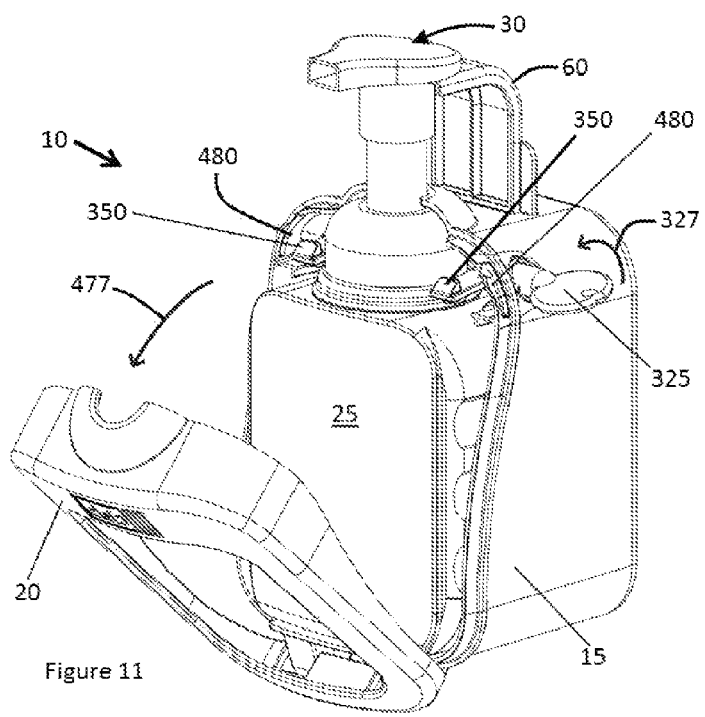
Figure 12:
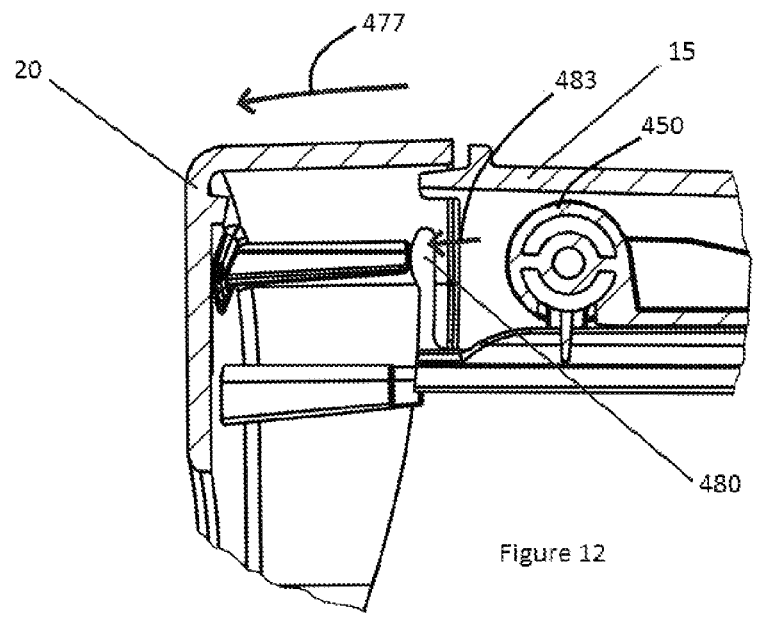
Figure 13:
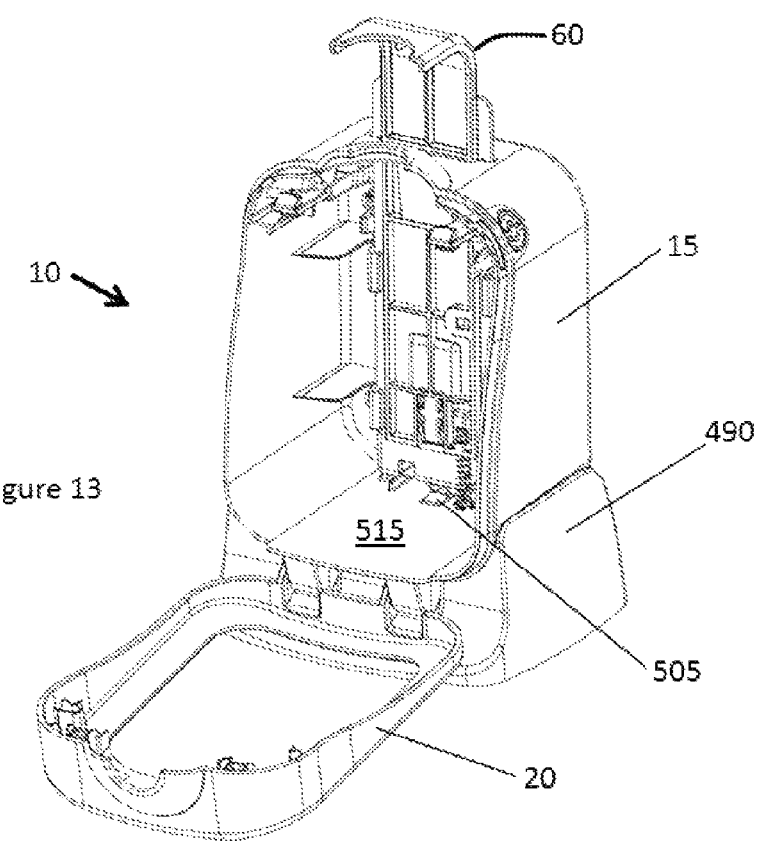
FIGS. 13-17 show a point-of-care dispenser system in which a point-of-care dispenser is configured for secure mounting with a corresponding docking unit.
Figure 14:
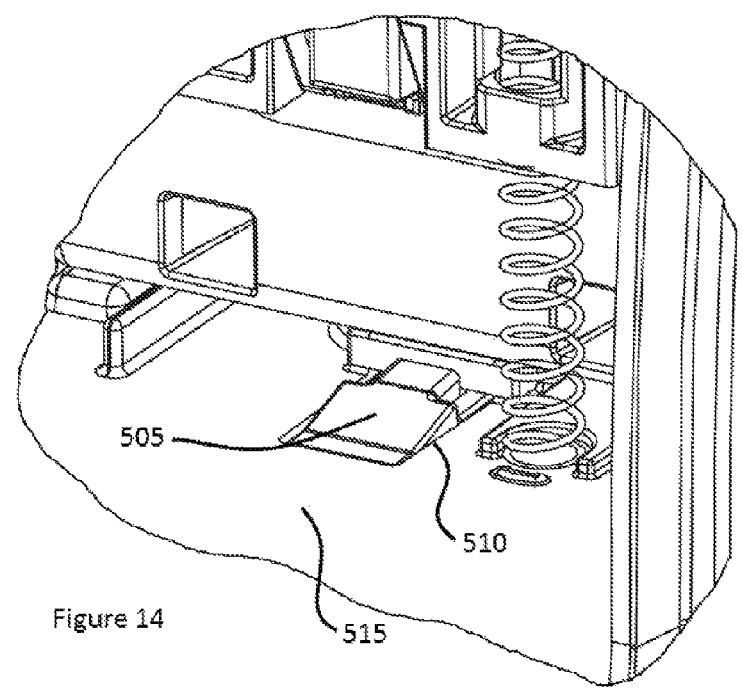
Figure 15:
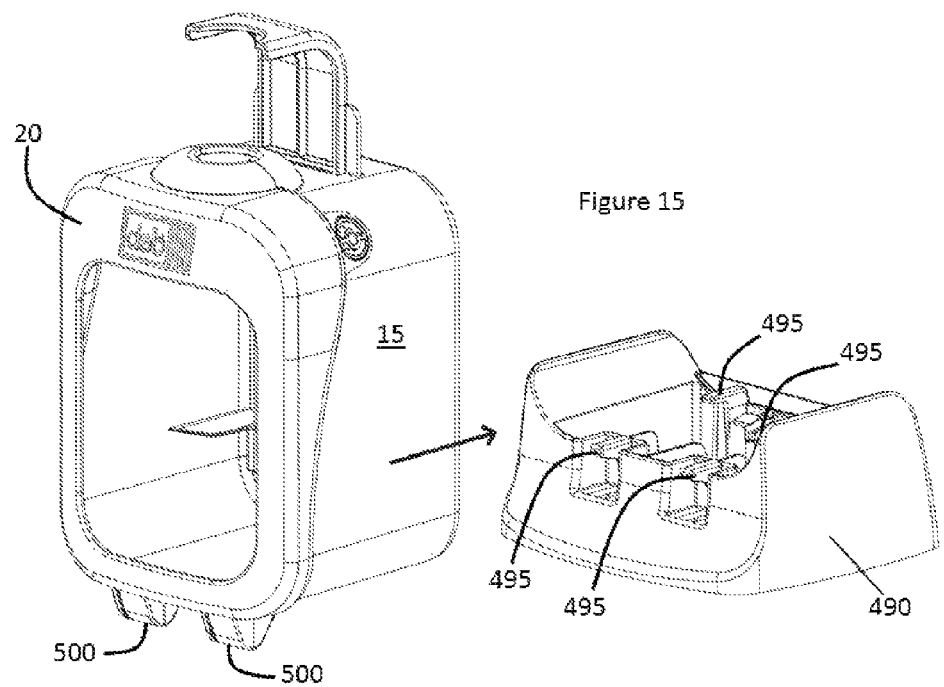
Figure 16:
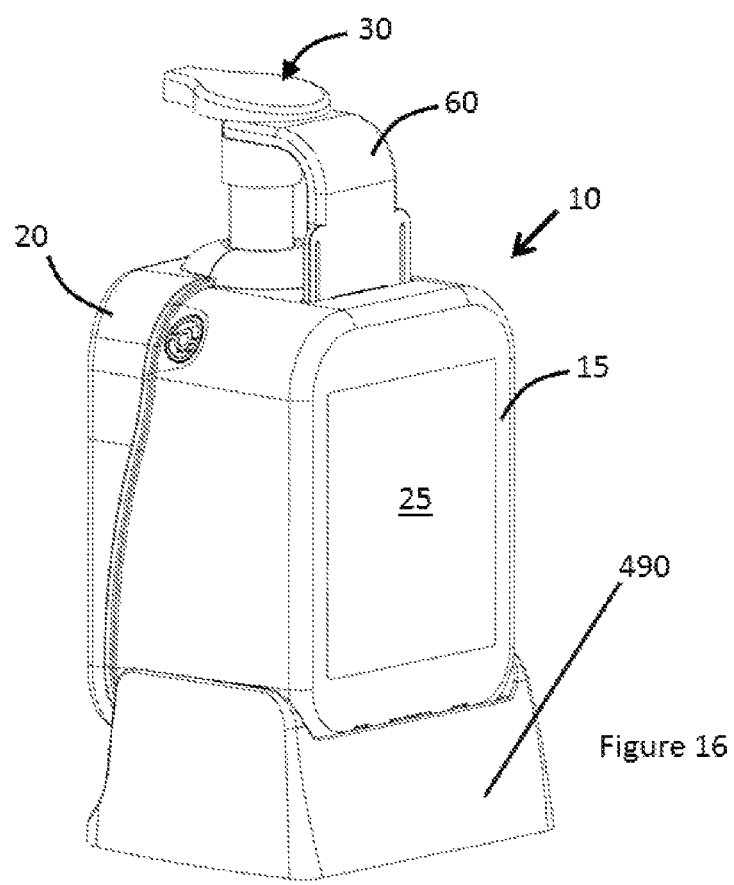
Figure 17:
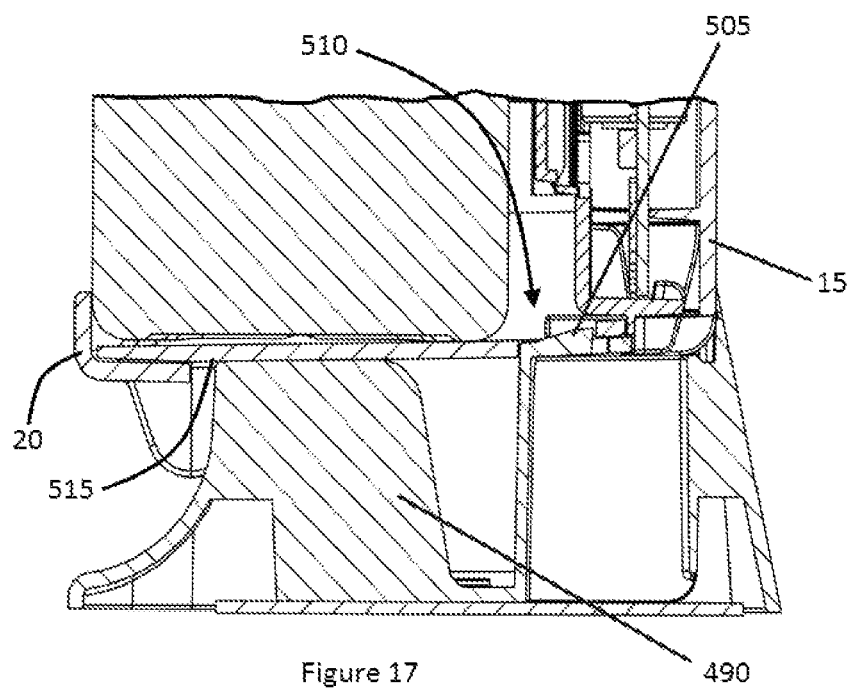

As important as the ability of the point-of-care dispenser 10 to remain locked against theft, is the ability for the point-of-care dispenser 10 to be opened easily by those permitted to do so, allowing them access to replace expended hand hygiene product packs. One example of making the point-of-care dispenser 10 easy to open is shown in FIGS. 11 and 12. Here, the key 325 is used to rotate the pivot portion 400 via the key barrel 405 in the direction of arrow 327 against the biasing force provided by the lock spring 365, thereby disengaging the main body interlock 440 from the dispenser cover interlock 465, and allowing the point-of-care dispenser 10 to be opened in the direction shown by arrow 477. During the process of opening the point-of-care dispenser 10, a plurality of cover opening springs 480 integral with a front edge of the main body 15 exert a force in the direction of arrow 483 assist in driving the dispenser cover 20 open. By ensuring that the cover opens in a substantially automatic manner during this process, lock damage caused by over rotation of the key 325 can be avoided since the operator receives a visual cue that the unlocking process is complete.

In addition to the securing the hand hygiene cartridge 25 inside the point-of-care dispenser 10, mounting options that are also secure may be desired to restrict the unsolicited removal of the entire point-of-care dispenser 10 from its proper location. In this regard, FIGS. 13 through 17 show the point-of-care dispenser 10 mounted onto a horizontal docking unit 490. This horizontal docking unit 490 may be securely mechanically fastened, for example, onto and upper horizontal surface of a piece of healthcare equipment. Mechanical fastening may include, for example, screwing or adhesively fixing the horizontal docking unit 490 onto an over-bed table or nightstand.

The elements used to secure the point-of-care dispenser 10 with the horizontal docking unit 490 may be configured to only allow removal of the dispenser 10 when the dispenser 10 is open with the dispenser cover 20 disengaged from the main body 15. To this end, the elements used to secure the point-of-care dispenser 10 with the horizontal docking unit 490 are only accessible when the dispenser is open.

In the examples shown in FIGS. 13-17, the horizontal docking unit 490 includes a plurality of mounting tabs 495 configured to engage corresponding mounting receptacles 500 at the bottom front and rear portions of the point-of-care dispenser 10. With the mounting tabs 495 engaged with the mounting receptacles 500, a securement tab 505 of the horizontal docking unit 490 extends through an opening 510 through the floor 515 of the point-of-care dispenser 10. The securement tab 505 includes an undercut that engages one or more edges of the opening 510 so that the more force applied to remove the dispenser 10 from the horizontal docking unit 490 causes a corresponding increase in the securing force between the securement tab 505 opening edges. Once the dispenser 10 is opened, however, the securement tab 505 may be resiliently directed out of the opening 510 to release the dispenser 10 from the horizontal docking unit 490.

Figure 18:
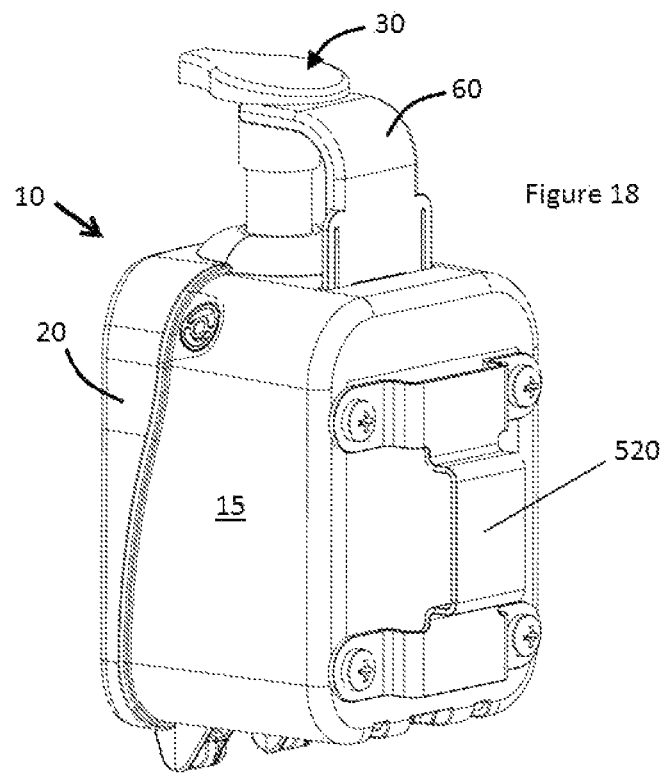
FIGS. 18-21 show a range of individual clamping options in which, through the use of mechanical fixings and/or tamper resistant mechanical fixings, the point-of-care dispenser can be securely mounted onto a range of healthcare equipment.
Figure 19:
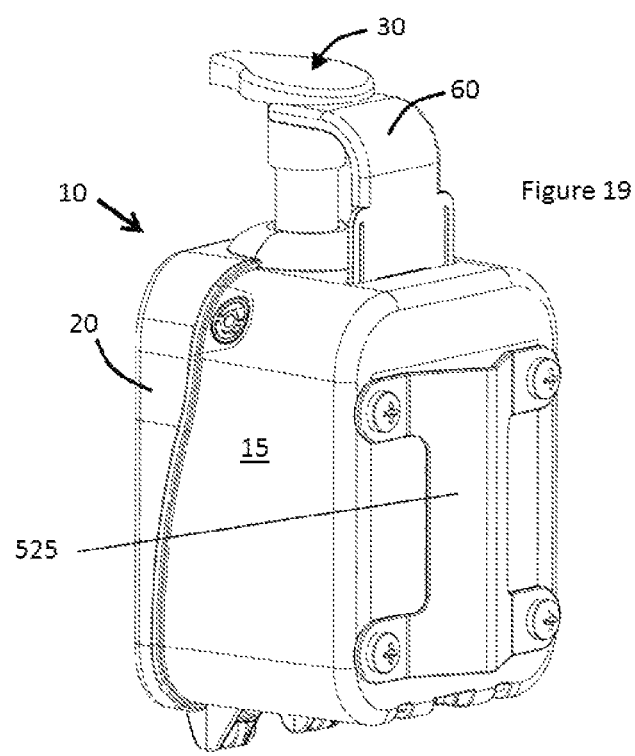

FIGS. 18 and 19 show a range of individual clamping options in which, through the use of mechanical fixings and/or tamper resistant mechanical fixings, the point-of-care dispenser 10 can be securely mounted onto a range of healthcare equipment. Such equipment often includes rectangular and circular rails (horizontal) and supports (vertical). More particularly, FIG. 18 shows a bracket 520 secured to the rear of a point-of-care dispenser 10, where the bracket 520 is configured to secure the dispenser 10 to a horizontal support. FIG. 19 shows a further bracket 525 secured to the rear portion of a point-of-care dispenser 10, where the bracket 525 is configured to secure the dispenser 10 to a vertical support.

Figure 20:
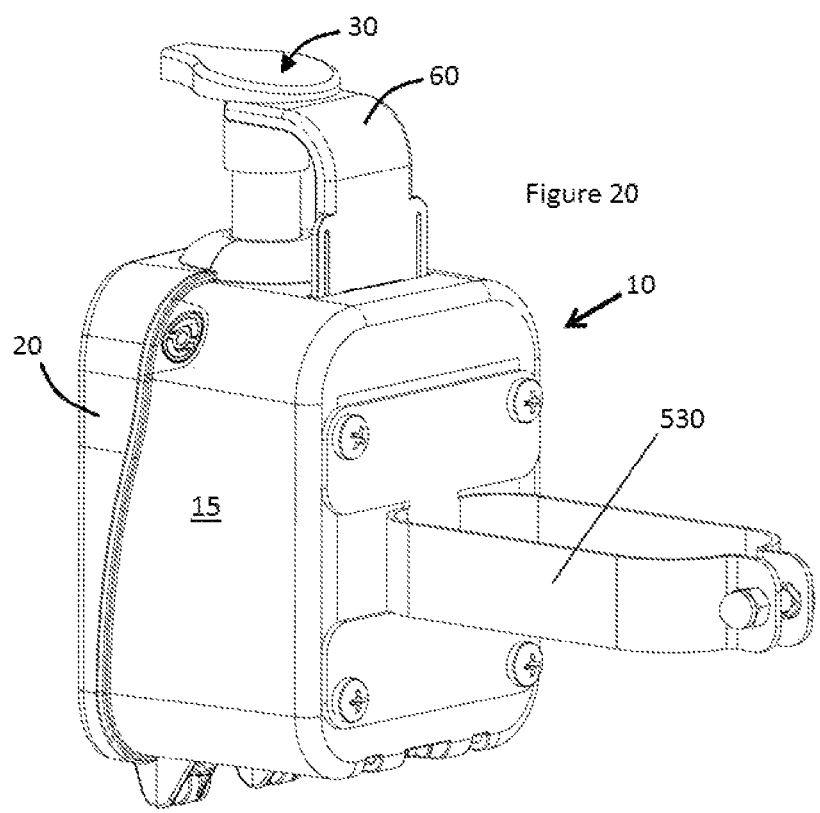
Figure 21:
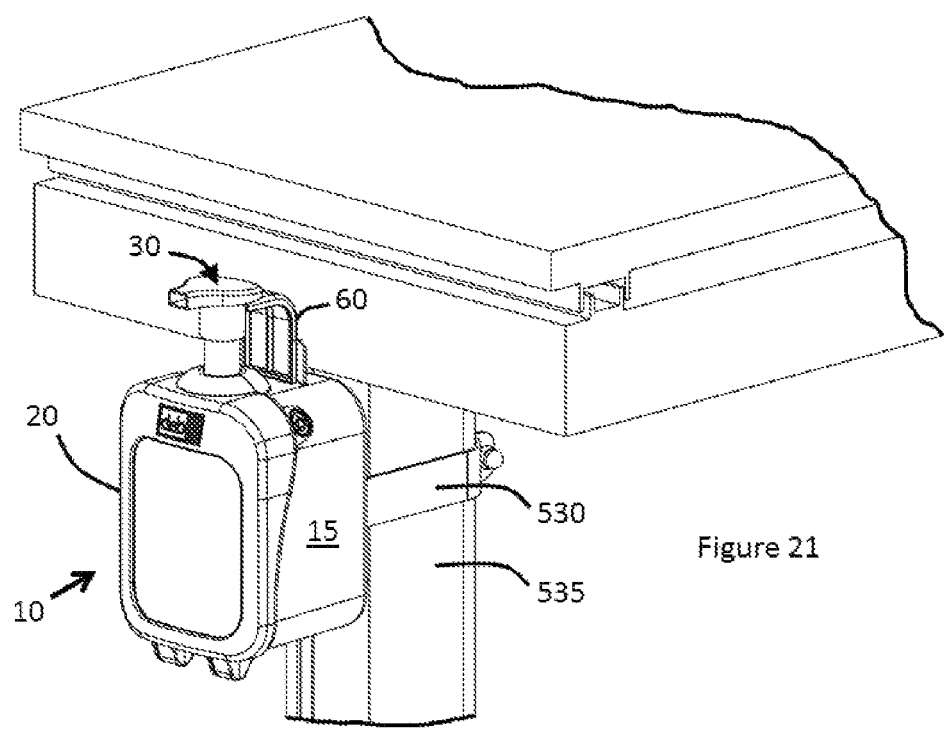

FIG. 20 shows a bracket 530 secured to the rear of a point-of-care dispenser 10, where the bracket 530 is specifically designed to mount the point-of-care dispenser 10 onto a vertical leg of an overbed table. FIG. 21 shows the point-of-care dispenser 10 mounted to the vertical leg 535 using the bracket 530. Again, through the use of mechanical mounting, the security of the dispenser 10 against opportunist theft can be maintained since mechanical tools are required for the successful removal of the mounting bracket 530.

The invention claimed is:

1. A point-of-care dispenser comprising:
    a main body having an interior defining a hand hygiene cartridge chamber;
    a dispenser cover secured to the main body for pivotal movement of the dispenser cover between an open condition with respect to the main body, and a closed condition with respect to the main body;
    at least one main body interlock secured to the main body, wherein the at least one body interlock includes an undercut feature; and
    at least one dispenser cover interlock secured to the dispenser cover, wherein the at least one dispenser cover interlock includes an undercut feature, wherein the undercut features of the at least one dispenser cover interlock and the at least one main body interlock engage one another when the dispenser cover is in a closed position with respect to the main body, and wherein engagement between the undercut features increases in response to an increase in a prying force used to move the dispenser cover from the closed condition to the open condition.

2. The point-of-care dispenser of claim 1, wherein the at least one main body interlock comprises:
    a lock spring; and
    a locking arm including,
    a rear portion configured to engage the lock spring,
    a pivot portion configured to allow rotation of the locking arm about a pivot axis,
    a hook element formed proximate a front portion of the arm, and
    a vertical opening extending at least partially through the locking arm proximate the hook element.

3. The point-of-care dispenser of claim 2, further comprising a key barrel extending from the pivot portion of the locking arm toward the exterior of the main body where it may accept key.

4. The point-of-care dispenser of claim 3, wherein the key barrel is resiliently deformable.

5. The point-of-care dispenser of claim 1, wherein the at least one main body interlock and the at least one dispenser cover interlock include camming surfaces configured to smoothly engage one another as the dispenser cover is moved from the open condition to the closed condition.

6. The point-of-care dispenser of claim 5, wherein the camming surfaces are configured to terminate engagement with one another once the dispenser cover is secured to the main body in the closed condition.

7. The point-of-care dispenser of claim 2, wherein the dispenser cover interlock comprises:
    a pair of parallel sidewalls extending toward the rear of the dispenser cover and terminating at a rectangular opening, wherein the regular opening is configured to accept the hook element; and
    a crossbar disposed proximate a lower edge of the rectangular opening to form the dispenser cover interlock undercut, wherein dispenser cover interlock undercut is configured to engage the vertical opening of the locking arm.

* * * * *